(12) United States Patent
Sui

(10) Patent No.: US 10,491,487 B2
(45) Date of Patent: Nov. 26, 2019

(54) NETWORK SERVICE ESTABLISHMENT METHOD, ORCHESTRATION CONTROL CENTER, AND NETWORK SYSTEM

(71) Applicant: Huawei Technologies Co., Ltd., Shenzhen, Guangdong (CN)

(72) Inventor: Zhicheng Sui, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 15/664,962

(22) Filed: Jul. 31, 2017

(65) Prior Publication Data

US 2017/0331703 A1  Nov. 16, 2017

Related U.S. Application Data

(63) Continuation of application No. PCT/CN2015/072061, filed on Jan. 31, 2015.

(51) Int. Cl.
*H04L 12/24* (2006.01)
*H04L 29/08* (2006.01)

(52) U.S. Cl.
CPC ...... *H04L 41/5003* (2013.01); *H04L 41/5041* (2013.01); *H04L 67/16* (2013.01)

(58) Field of Classification Search
CPC .......... H04L 41/5003; H04L 41/5041; H04L 41/5051; H04L 41/12; H04L 41/5058; H04L 29/06; H04L 67/16

(Continued)

(56) References Cited

U.S. PATENT DOCUMENTS 8,131,606 B2 * 3/2012 Bellacicco ............. G06Q 10/06
705/28
2004/0093381 A1 * 5/2004 Hodges .................. G06Q 30/02
709/204

(Continued)

FOREIGN PATENT DOCUMENTS

CN 101621497 A 1/2010
CN 101631071 A 1/2010

(Continued)

OTHER PUBLICATIONS

Zheng et al., "Multi-layer protection in IP-over-WDM networks with and with no backup lightpath sharing", Computer Networks, vol. 50, No. 3, Feb. 2006, pp. 301-316.

*Primary Examiner* — Kristie D Shingles
(74) *Attorney, Agent, or Firm* — Kilpatrick Townsend & Stockton LLP

(57) ABSTRACT

The present disclosure provides a network service establishment method, an orchestration control center, and a network system. The method includes: obtaining, by means of screening according to QoP information and SLA information of a service, all target service protection types that satisfy the QoP information and/or the SLA information of the service for each layer network in a multi-layer network; determining, according to all the target service protection types, at least one group of multi-layer service protection types that satisfy the QoP information and the SLA information of the service for the multi-layer network; determining a group of target multi-layer service protection types of the service according to network topology information and resource usage of each layer network from the at least one group of the multi-layer service protection types; and sending an instruction message that carries the target multi-layer service protection types to a network controller.

20 Claims, 8 Drawing Sheets

(58) Field of Classification Search
USPC .......................................................... 709/223
See application file for complete search history.

(56) References Cited

U.S. PATENT DOCUMENTS

| | | |
|---|---|---|
| 2014/0078895 A1 | 3/2014 | Iovanna et al. |
| 2014/0307538 A1 | 10/2014 | Iovanna et al. |
| 2014/0314400 A1 | 10/2014 | Lee |
| 2018/0241636 A1* | 8/2018 | Zhang .................. H04L 41/145 |

FOREIGN PATENT DOCUMENTS

| | | |
|---|---|---|
| CN | 102186124 A | 9/2011 |
| JP | 2012010109 A | 1/2012 |

* cited by examiner

NETWORK SERVICE ESTABLISHMENT METHOD, ORCHESTRATION CONTROL CENTER, AND NETWORK SYSTEM

CROSS-REFERENCE TO RELATED APPLICATIONS

This application is a continuation of International Application No. PCT/CN2015/072061, filed on Jan. 31, 2015, the disclosure of which is hereby incorporated by reference in its entirety.

TECHNICAL FIELD

The present disclosure relates to the communications field, and in particular, to a network service establishment method, an orchestration control center, and a network system.

BACKGROUND

Currently, in a two-layer network constituted by an IP network and a transport network (e.g., an optical transport network (OTN) and/or a wavelength division multiplexing (WDM) transport network), the IP network and the transport network generally operate independently, and in an operation process, the IP network has a requirement on operation of the transport network to drive planning and construction of the optical network.

In the prior art, the IP network and the transport network have separate protection and recovery mechanisms. Specifically, a Multiprotocol Label Switching (MPLS) service is protected at an IP layer, and there are service protection types such as hot-standby protection (Hot-Standby), fast reroute (FRR) protection, and redundant port protection. Transport network protection is protection for an IP link of an IP network layer, and there are service protection types such as 1+1 protection, 1:1 protection, and 1+1:1 protection. If an IP link is protected in the transport network, IP services in the entire IP link are protected.

However, service protection types are fixed in an existing two-layer network constituted by an IP network and an optical network, and only a same service protection type can be used. Therefore, different service protection types cannot be dynamically selected for different Multiprotocol Label Switching-Traffic Engineering (MPLS-TE) services according to real-time resource statuses of the IP network and the transport network. As a result, an additional increase of network establishment costs is required for an optical layer, and network resource use efficiency is reduced.

SUMMARY

Embodiments of the present disclosure provide a network service establishment method, an orchestration control center, and a network system, so as to improve network resource utilization, and reduce network establishment costs.

To achieve the foregoing objective, the following technical solutions are used in the embodiments of the present disclosure:

According to a first aspect, a network service establishment method is provided, is applied to a multi-layer network, and the method includes:

receiving, by an orchestration control center, a service establishment request of a service; where the service establishment request includes quality of protection QoP information and service level agreement SLA information of the service;

obtaining, by means of screening, all target service protection types that satisfy the QoP information and/or the SLA information of the service for each layer of network in the multi-layer network;

acquiring at least one group of multi-layer service protection types that satisfy the QoP information and the SLA information of the service for the multi-layer network; where the at least one group of multi-layer service protection types relates to all the target service protection types of each layer of network in the multi-layer network, each group of the at least one group of the multi-layer service protection types includes a target service protection type of each layer of network in the multi-layer network;

determining a group of target multi-layer service protection types of the service according to network topology information of each layer of network and resource usage of each layer of network from the at least one group of the multi-layer service protection types that satisfy the QoP information and the SLA information of the service; where the service needs fewest network resources in the target multi-layer service protection types; and sending an instruction message that carries the target multi-layer service protection types to a network controller corresponding to the multi-layer network; where the instruction message is used to instruct the network controller of the multi-layer network to determine a service link according to the target multi-layer service protection types.

According to a second aspect, an orchestration control center is provided. The orchestration control center is applied to a multi-layer network, and the orchestration control center includes:

a receiver, configured to receive a service establishment request of a service; where the service establishment request includes quality of protection QoP information and service level agreement SLA information of the service;

a processor, configured to obtain by means of screening, all target service protection types that satisfy the QoP information and/or the SLA information of the service for each layer of network in the multi-layer network;

further configured to acquire at least one group of multi-layer service protection types that satisfy the QoP information and the SLA information of the service for the multi-layer network; where the at least one group of multi-layer service protection types relates to all the target service protection types by means of screening and that are of each layer of network in the multi-layer network, each group of the at least one group of the multi-layer service protection types includes a target service protection type of each layer of network in the multi-layer network;

further configured to determine a group of target multi-layer service protection types of the service according to network topology information of each layer of network and resource usage of each layer of network from the at least one group of the multi-layer service protection types that satisfy the QoP information and the SLA information of the service; where the service needs fewest network resources in the target multi-layer service protection types; and a transmitter, configured to send an instruction message that carries the target multi-layer service protection types determined by the processor to a network controller corresponding to the multi-layer network; where the instruction message is used to instruct the network controller of the multi-layer network to determine a service link according to the target multi-layer service protection types.

According to a third aspect, a network system is provided. The network system is applied to a multi-layer network, and the network system includes an orchestration control center and a network controller of the multi-layer network; where the orchestration control center is configured to receive a service establishment request of a service; where the service establishment request includes quality of protection QoP information and service level agreement SLA information of the service;

the orchestration control center is further configured to obtain, by means of screening, all target service protection types that satisfy the QoP information and/or the SLA information of the service for each layer of network in the multi-layer network, and acquire at least one group of multi-layer service protection types that satisfy the QoP information and the SLA information of the service for the multi-layer network; where the at least one group of multi-layer service protection types relates to all the target service protection types of each layer of network in the multi-layer network, each group of the at least one group of the multi-layer service protection types includes a target service protection type of each layer of network in the multi-layer network;

the orchestration control center is further configured to determine a group of target multi-layer service protection types of the service according to network topology information of each layer of network and resource usage of each layer of network from the at least one group of the multi-layer service protection types that satisfy the QoP information and the SLA information of the service; where the service needs fewest network resources in the target multi-layer service protection types;

the orchestration control center is further configured to send an instruction message that carries the target multi-layer service protection types to the network controller corresponding to the multi-layer network; and the network controller of the multi-layer network is configured to receive the instruction message, and determine a service link according to the target multi-layer service protection types carried in the instruction message.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
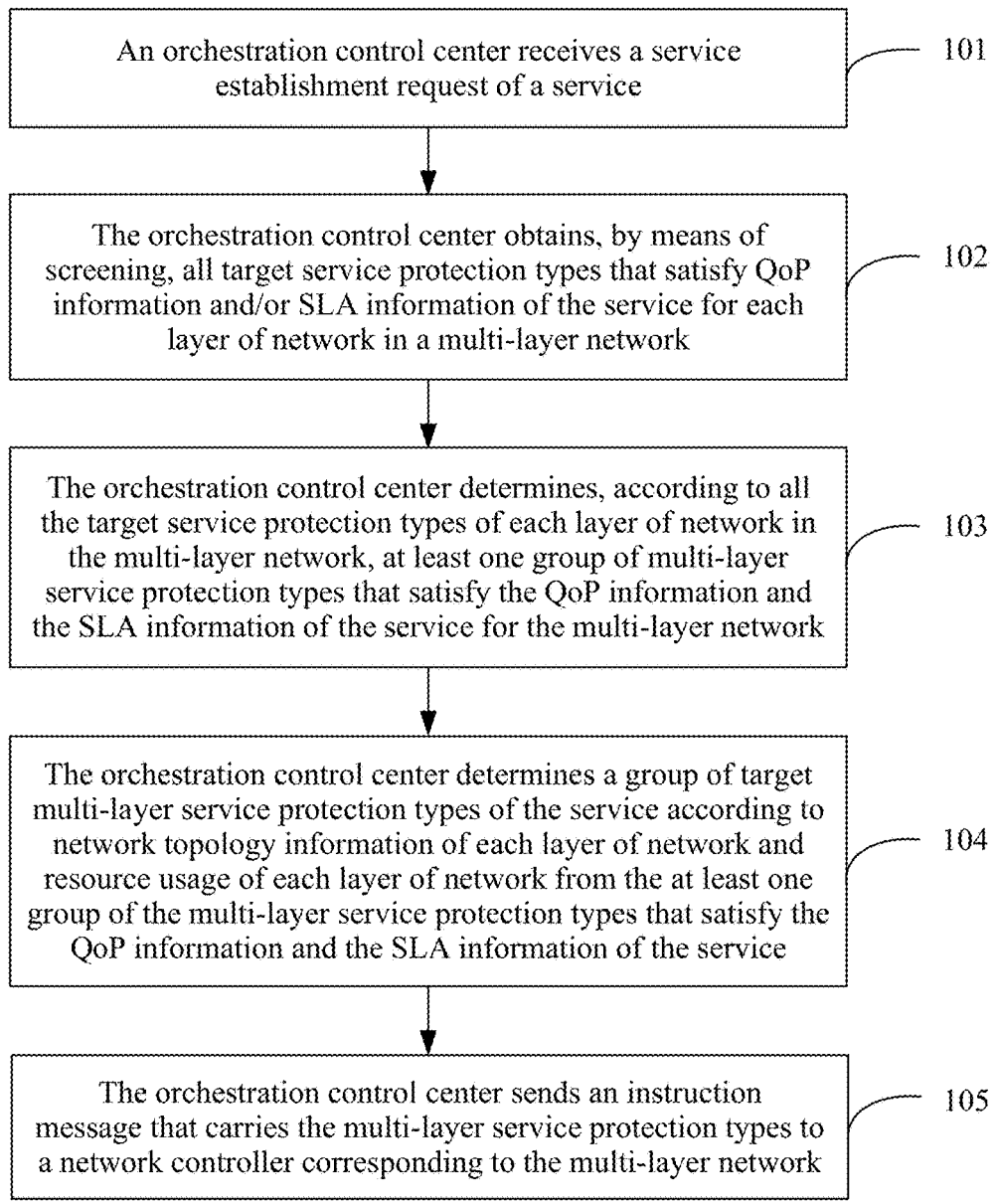
FIG. 1 is a schematic flowchart of a network service establishment method according to an embodiment of the present disclosure.

An embodiment of the present disclosure provides a network service establishment method. As shown in FIG. 1, the method specifically includes the following steps.

101. An orchestration control center receives a service establishment request of a service.

The service establishment request includes but is not limited to quality of protection (QoP) information and service level agreement (SLA) information of the service, and a latency requirement of the service. The QoP information of the service includes a fault tolerance level of a link of each layer of network in a multi-layer network that carries the service, for example, a fiber tolerates one fault or an IP port tolerates one fault. The SLA information includes quality of service information provided by the multi-layer network for the service carried by the multi-layer network, for example, includes a failover time. For example, the failover time of the service is non-50 ms, that is, the failover time of the service is greater than 50 ms.

102. The orchestration control center obtains, by means of screening, all target service protection types that satisfy QoP information and/or SLA information of the service for each layer of network in a multi-layer network.

A target service protection type of at least one layer of network in the multi-layer network satisfies both the QoP information and the SLA information of the service, or a target service protection type of at least one layer of network satisfies the QoP information of the service and a target service protection type of at least one layer of network satisfies the SLA information of the service.

For example, a service protection type list is stored in the orchestration control center. The service protection type list includes a service protection type corresponding to a service in each layer of network in the multi-layer network and parameter information corresponding to each service protection type. The orchestration control center matches the parameter information that is corresponding to each service protection type and that is in the service protection type list with the QoP information and the SLA information of the service, and obtains, by means of screening, a target service protection type that matches at least one of the QoP information or the SLA information of the service from the service protection type list. It should be noted that a specific implementation manner in which the orchestration control center obtains, by means of screening, the target service protection type that satisfies the QoP information and/or the SLA information of the service includes: a target service protection type of a layer of network in the multi-layer network satisfies both the QoP information and the SLA information of the service, or a combination of target service protection types of at least two layers of network satisfies the QoP information and the SLA information of the service.

For example, a two-layer network constituted by an IP network and an optical transport network (OTN) is used as an example. A service protection type of the IP network in the two-layer network includes: any one of redundant port protection, hot-standby protection (Hot-Standby), fast reroute (FRR) protection, 1: N protection, or unprotect. The redundant port protection means that there is a dedicated alternate port on a router to protect all other working ports, that is, when any working port encounters a fault, traffic is switched to the alternate port for protection. The hot-standby protection means that an alternate path is always in an operating state, and a service interruption of a service that is caused by a link fault, a device fault, or the like is effectively avoided. The fast reroute protection means that, when a link or a node is invalid, traffic carried on a label switched path (LSP) that passes through the valid link or node is quickly re-switched to a protection link. A service protection type of the OTN network in the multi-layer network for an IP link includes any one of 1+1 protection, 1:1 protection, 1+1:1 protection, or unprotect. The 1+1 protection means that a resource of a working path and a resource of an alternate path are exclusively occupied. The 1:1 protection means that the resources of the working path and the alternate path may be shared with another service. The 1+1:1 protection means that the resource of the first alternate path is exclusively occupied, and the resource of the second alternate path may be shared with another service. It should be noted that a difference of the 1:N protection and the 1:1 protection is merely that capacities of overlapped paths shared by alternate paths of different services are different.

It should be noted that redundant port protection, the hot-standby protection, the FRR protection, and the 1: N protection tolerate one fault. An ensured failover time of FRR protection is 50 ms, and an ensured failover time of the redundant port protection, the hot-standby protection, the 1: N protection, and the unprotect is non-50 ms. In addition, the 1+1 protection and 1:1 protection tolerate one fault, and the 1+1:1 protection tolerates two faults. An ensured failover time of the 1+1 protection is 50 ms, and an ensured failover time of the 1:1 protection, 1+1:1 protection, and the unprotect is non-50 ms.

103. The orchestration control center determines, according to all the target service protection types of each layer of network in the multi-layer network, at least one group of multi-layer service protection types that satisfy the QoP information and the SLA information of the service for the multi-layer network.

Each group of the at least one group of the multi-layer service protection types includes a target service protection type of each layer of network in the multi-layer network.

For example, a two-layer network constituted by an IP network and an optical OTN network is used as an example. If a user requests to establish a one-fault-tolerant Multiprotocol Label Switching-Traffic Engineering (MPLS-TE) service bandwidth with non-50 ms recovery, the orchestration control center determines, according to network topology information of the IP network, network topology information of the OTN network, and network resource usage of each layer of network in the two-layer network, two multi-layer protection types: redundant port protection that can tolerate one fault and 1:1 protection that can ensure a non-50 ms failover time, and Hot-Standby that can ensure a non-50 ms failover time and 1+1 protection that can tolerate one fault.

104. The orchestration control center determines a group of target multi-layer service protection types of the service according to network topology information of each layer of network and resource usage of each layer of network from the at least one group of the multi-layer service protection types that satisfy the QoP information and the SLA information of the service.

The network topology information includes node information of nodes of a network to which the network topology information belongs and topology structure information in the nodes. The resource usage of each layer of network is an idle resource in each current service link of each layer of network. The service needs fewest network resources in the target multi-layer service protection types. The multi-layer service protection types consist of service protection types of all layers of network in the multi-layer network.

Optionally, after step 104, the method further includes the following steps.

104a. The orchestration control center determines a target multi-layer service protection type of the service and an SLA level of the service according to the network topology information of each layer of network and the resource usage of each layer of network.

The SLA level specifically includes three levels. A first level is strict Diffserv, that is, service protection types of all layers of network are strictly differentiated, and services of different service protection types are independently mounted into respective pipes. For example, four services: a service with FRR and optical layer 1:1 protection, a service with FRR protection, a service with optical layer 1:1 protection, and a service with optical layer unprotect are separately mounted into independent IP links. This can fully ensure that the services are strictly differentiated according to the SLA level. A second level is loose Diffserv, that is, all services of the SLA level are differentiated according to protection types of IP links carried by the services. An OTN network is used as an example. Two commonly used types are unprotect and optical layer 1:1 protection, and certainly, there is another type, for example, optical layer 1+1 protection. The unprotect means that the IP links carried by the services are in an unprotect mode at an optical layer, and the 1:1 means that the IP links carried by the services are in a 1:1 protection mode at the optical layer. A third level is no Diffserv, that is, all services of the SLA level are not differentiated according to pipe types of IP links, and are mounted into IP links of a same type.

For example, the following describes the first level differentiation and the second level differentiation of the SLA level by respectively using example 1 and example 2.

Example 1

The first level differentiation is that service protection types of an IP layer and service protection types of an optical layer are strictly differentiated. For example, the following four cases may be included:

(1) service 1 (two-fault tolerance with 50 ms recovery) is corresponding to TE FRR and virtual local area network (Virtual Local Area Network, VLAN for short) 1:1;

(2) service 2 (one-fault tolerance with 50 ms recovery) is corresponding to TE FRR;

(3) service 3 (one-fault tolerance with optical bandwidth ensured recovery) is corresponding to VLAN 1:1; and (4) service 4 (without optical bandwidth ensured recovery) is corresponding to optical layer unprotect.

Priorities of the four services are as follows: service 1, service 2, service 3, and service 4.

Example 2

The second level differentiation is that, service protection types of an optical layer may be differentiated, and service protection types of an IP layer are not differentiated. For example, the following two cases may be included:

(1) service 1 (two-fault tolerance with 50 ms recovery) is corresponding to TE FRR and virtual local area network (Virtual Local Area Network, VLAN for short) 1:1; and service 3 (one-fault tolerance with optical bandwidth ensured recovery) is corresponding to VLAN 1:1; and (2) service 2 (one-fault tolerance with 50 ms recovery) is corresponding to TE FRR; and service 4 (without optical bandwidth ensured recovery) is corresponding to optical layer unprotect.

Specifically, the services of the four service protection types are separately mounted into four IP links in example 1. However, service 1 and service 3 are statistically multiplexed to one IP link in example 2, or service 2 and service 4 are statistically multiplexed to one IP link, and an IP link is corresponding to a VLAN sub-link. In addition, a recovery path, at the optical layer, of an IP link through which a working path of service 1 passes needs to be separated from a working IP link and a protection IP link; therefore, a latency is increased because a recovery path of service 3 needs to satisfy a stronger two-fault tolerance limitation of service 1 in example 2.

In addition, in addition to an optimal multi-layer service protection type and a multi-layer SLA resource establishment level of establishing the service, the orchestration control center may further determine an IP layer pipe type and/or a network technology level according to the network topology information of each layer of network and the resource usage of each layer of network.

Optionally, after step 104 and/or step 104*a*, the method further includes the following steps.

104*b*. The orchestration control center determines an IP layer pipe type and/or a used network technology of the service according to the network topology information of each layer of network and the resource usage of each layer of network.

Specifically, the IP layer pipe type includes but is not limited to four types: ODU flex (flexible rate optical data unit), packet, ODUk (optical channel data unit), and physical resource. The different pipe types are mainly corresponding to different resource granularities and resource types. The ODU flex is corresponding to a circuit hard pipe of a fine granularity, and a pipe granularity is an integer multiple of a 1.25 G ODU0 (a frame period signal type of an OTN signal) bandwidth. The packet is corresponding to a packet soft pipe, and is traffic of any bandwidth size. The ODUk is corresponding to a circuit hard pipe of a coarse granularity, and a pipe granularity is k, where k=0, 1, 2, 3, 4, 5, . . . , which are 1.25 G, 2.5 G, 10 G, 40 G, 100 G, . . . respectively. The Physical is corresponding to an optical layer wavelength resource and does not pass through an electrical layer resource.

The network technology may be classified into three levels. A first level is gray light/colored light. The gray light means that a router device uses a gray light interface to connect a gray light interface of an OTN device, and the colored light means that the router device directly uses a colored light interface to connect a reconfigurable optical add/drop multiplexer (ROADM) device. A second level is 48*10 G high density integration or 100 G VLAN. The 10 G high density integration means that the router device uses a 10 G silicon light interface to connect the gray light interface of the OTN device, and the gray light pipe is converged into a large rate pipe on the OTN device, and the 100 G VLAN means that the router device uses a 100 G gray light interface to connect the gray light interface of the OTN device, and the OTN device needs to identify the VLAN and perform grooming at this sub-pipe electrical layer for converging into a large pipe. A third level is an MS-OTN characteristic enabled by a station. The MS-OTN characteristic includes a packet processing function and a circuit pipe processing function. For example, some stations do not have the packet processing function but have the circuit pipe processing function, and some station have both the packet processing function and the circuit pipe processing function.

For example, when the orchestration control center determines the IP layer pipe type and a network data level according to the network topology information of each layer of network and the resource usage of each layer of network, a principle of using fewest network resources is mainly used for selection. For example, if an ODU2 is of 10 G, and the ODU flex is of an integer multiple of 1.25 G, and if a current service is of 500 M, and 9.9 G of an ONU2 is used, and a new 10 G link needs to be added if the ONU2 is selected, the ONU flex is selected. In the 48*10 G high density integration or the 100 G VLAN, when the 48*10 G high density integration and the 100 G VLAN each have sufficient resources, the 48*10 G high density integration is selected. When 9.9 G of the 48*10 G high density integration is used, and a new link needs to be added if the 48*10 G high density integration is selected, the 100 G VLAN is selected.

105. The orchestration control center sends an instruction message that carries the target multi-layer service protection types to a network controller corresponding to the multi-layer network.

The instruction message is used to instruct the network controller of the multi-layer network to determine a service link according to the target multi-layer service protection types. For example, the orchestration control center may send the instruction message to a network controller of a network at a bottom layer, and the network controller of the network at the bottom layer calculates, according to the network topology information of each layer of network and the resource usage of each layer of network, a resource use path in which fewest network resources are used and that is of the service in the multi-layer service protection type, determines IP link resources that need to be established and adjusted, and sends a resource establishment or removal request to a network controller of a network at another layer, so that the network controller of the network at the another layer establishes, according to the resource establishment or removal request, a service link that needs to be established or removed by the network controller. Alternatively, the orchestration control center may send the instruction message to a network controller of each layer of network, and the network controller of each layer of network calculates a resource use path in which fewest network resources are used and that is of the service in a service protection type corresponding to the network, and determines a service link that needs to be established or removed. Specifically, the service link determined by the network controller includes a working service link and a standby service link.

According to the network service establishment method provided in this embodiment of the present disclosure, an orchestration control center obtains, by means of screening according to QoP information and SLA information of a service, all target service protection types that satisfy the QoP information and the SLA information of the service for each layer of network in the multi-layer network, determines, according to all the target service protection types of each layer of network in the multi-layer network, at least one group of multi-layer service protection types that satisfy the QoP information and the SLA information of the service for the multi-layer network, determines target multi-layer service protection types of the service according to network topology information of each layer of network from all multi-layer service protection types that satisfy the QoP information and the SLA information of the service, and sends an instruction message that carries the target multi-layer service protection types to a network controller corresponding to the multi-layer network. The service needs fewest network resources in the target multi-layer service protection types, and because the target multi-layer service protection types consist of target service protection types of services in all layers of network, protection requirements of all the layers of network in the multi-layer network can be satisfied, thereby improving network resource utilization, and reducing network establishment costs.

An embodiment of the present disclosure provides a network service establishment method. Based on step 101 to step 105 that are provided in the foregoing embodiment, step 104 may be replaced with step 104a1 to step 104a3 in this embodiment.

Figure 2:
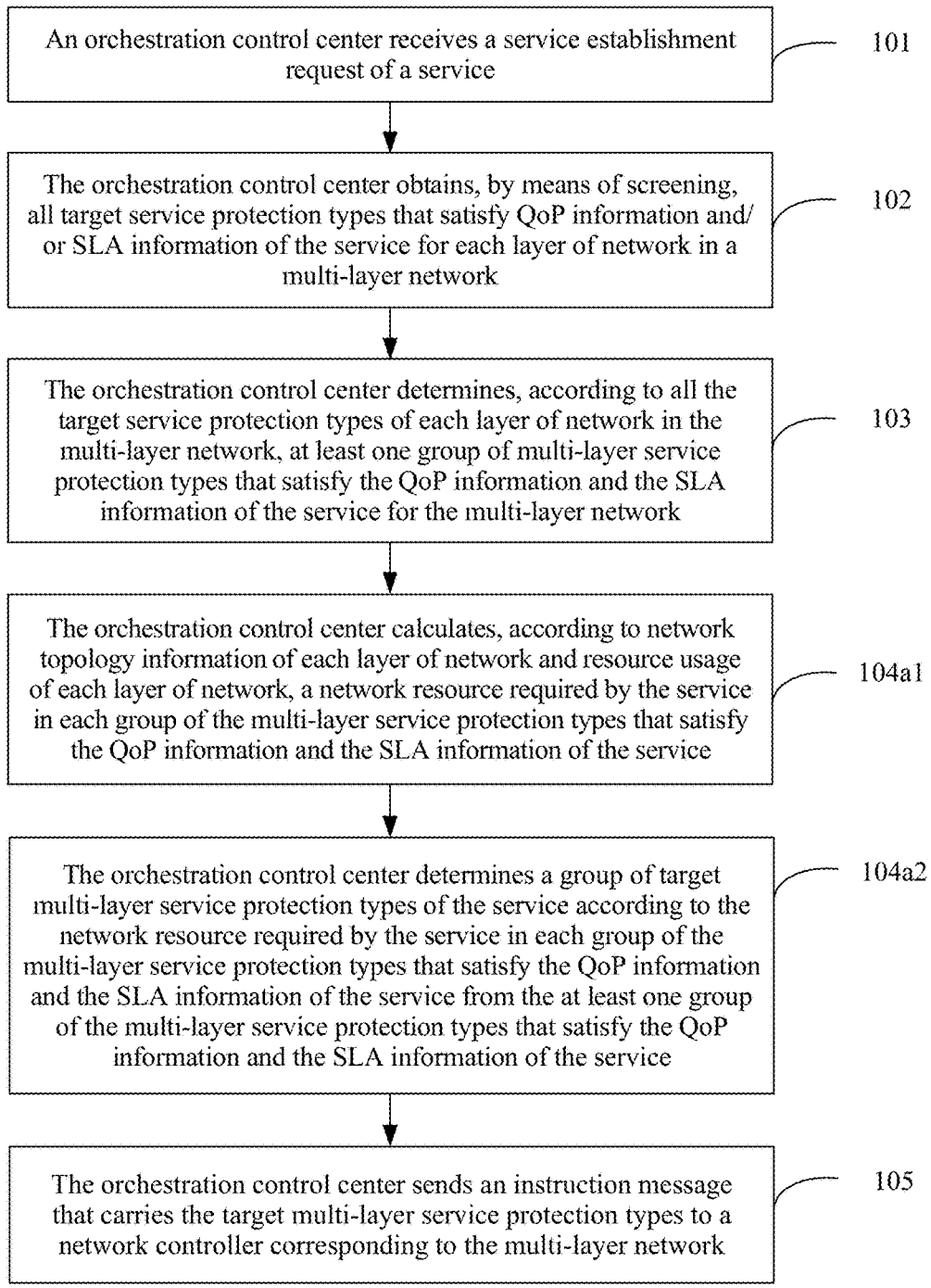
FIG. 2 is a schematic flowchart of another network service establishment method according to an embodiment of the present disclosure.

As shown in FIG. 2, when step 104 is replaced with step 104a1 and step 104a2, the method includes the following steps.

104a1. The orchestration control center calculates, according to the network topology information of each layer of network and the resource usage of each layer of network, a network resource required by the service in each group of the multi-layer service protection types that satisfy the QoP information and the SLA information of the service.

104a2. The orchestration control center determines the group of the target multi-layer service protection types of the service according to the network resource required by the service in each group of the multi-layer service protection types that satisfy the QoP information and the SLA information of the service from the at least one group of the multi-layer service protection types that satisfy the QoP information and the SLA information of the service.

The service needs the fewest network resources in the target multi-layer service protection types.

For example, in solution 1, an embodiment corresponding to FIG. 2 is applied to a specific software defined network (SDN) architecture for detailed description.

Figure 3:
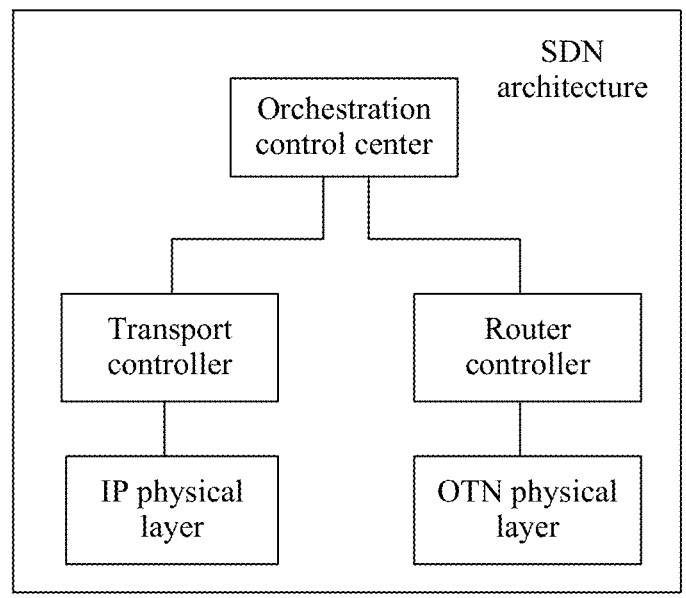
FIG. 3 is a schematic diagram of an SDN network architecture according to an embodiment of the present disclosure.

As shown in FIG. 3, the SDN architecture includes an orchestration control center Orchestrator, a router controller (R-C), a transport controller (T-C), an IP network device, and an OTN network device. A two-layer network constituted by an IP network and an optical transport network is used as an example for description.

Figure 4A:
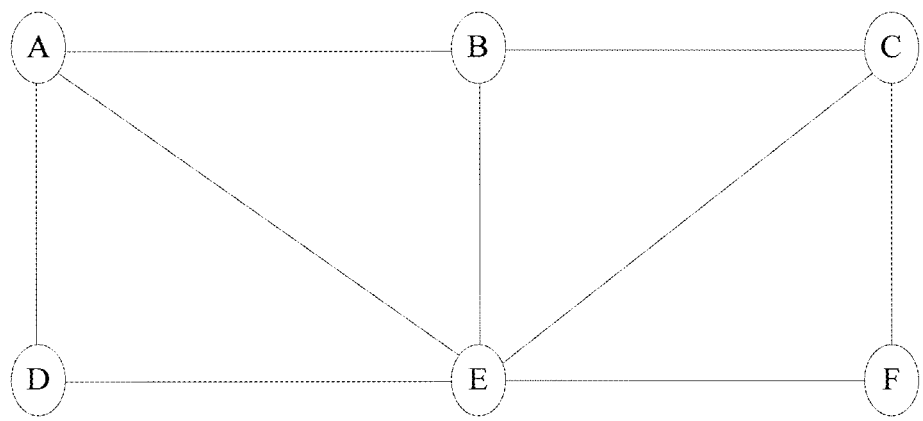
FIG. 4a is an IP network topology view according to an embodiment of the present disclosure.

Based on the SDN architecture shown in FIG. 3, it may be learned by referring to an IP network topology view shown in FIG. 4a that four IP links A-B, B-C, A-E, and E-C included in the IP network separately have ODU0 idle resources, service protection types of the four IP links are unprotect at an optical layer, physical paths, at a physical layer, of IP links A-B and B-C and IP links A-E and E-C do not pass through a same fiber, each IP node supports VNT redundant port protection, and a client requests to establish a one-fault-tolerant MPLS-TE service bandwidth ODU0 from node A to node C and with non-50 ms recovery.

(1) A user sends the service establishment request that includes the QoP information and the SLA information to the orchestration control center.

For example, the user dynamically requests to the orchestration control center for establishing a one-fault-tolerant MPLS-TE service bandwidth ODU0 link with non-50 ms recovery.

(2) After receiving the service establishment request, the orchestration control center separately obtains, by means of screening, all target service protection types that satisfy the QoP information and/or the SLA information in the service establishment request for the IP layer and the optical layer, and determines, according to all the target service protection types, of the optical layer and the IP layer, obtained by means of screening, all multi-layer service protection types that satisfy the QoP information and the SLA information for the two-layer network constituted by the IP layer and the optical layer.

For example, the service protection types, of the IP layer and the optical layer, determined by the orchestration control center may include two multi-layer service protection types: redundant port and VLAN 1:1 protection, and hot-standby protection.

(3) After obtaining network topology information of the IP network and network topology information of the OTN network, the orchestration control center separately pre-calculates a network resource A required by the service when a service protection type is redundant port and VLAN 1:1, pre-calculates a network resource B required by the service when the service protection type is hot-standby protection, and determines a group of target multi-layer service protection types of the service according to A and B.

Specifically, in this embodiment, because the service protection types of all the IP links are unprotect at the optical layer, and preset optical path resources of the IP links in a 1:1 mode at the optical layer may be shared, when the service protection type is the redundant port and VLAN 1:1, preset optical path resources, at the optical layer, of two optical layer services corresponding to the IP links A-B and B-C need to be added for the required network resource A, and when the service protection type is the hot-standby protection, the ODU0 idle resources in the four original IP links may be used. Quantities of newly added resources for the two service protection types are compared, and it is concluded that A is greater than B. The orchestration control center selects the service protection type, that is, the hot-standby protection, in which few resources are required as an optimal service protection type. In addition, because the four IP links in a solution B in which fewest resources are newly added are unprotected, it may be determined that the SLA level of the service is the third level. If the resource A is less than the resource B and a solution A is selected, and because at least the VLAN 1:1 is included, the SLA level of the service is the second level or the first level.

(4) The orchestration control center sends service resource selection information that includes a service protection type and a solution in which fewest network resources are used to the router controller, where the resource selection information includes the service protection type, that is, the hot-standby protection, and may further include the third SLA level and an IP layer pipe type and a network technology level that are selected according to a principle of using fewest network resources.

(5) The router controller calculates an optimal resource use path A-B-C, or A-E-C according to the received service resource selection information, and the router controller triggers a service head node A in the IP network device to successfully establish an end-to-end path by using original IP links A-B, B-C, A-E, and E-C without adding a new IP layer resource.

Figure 5:
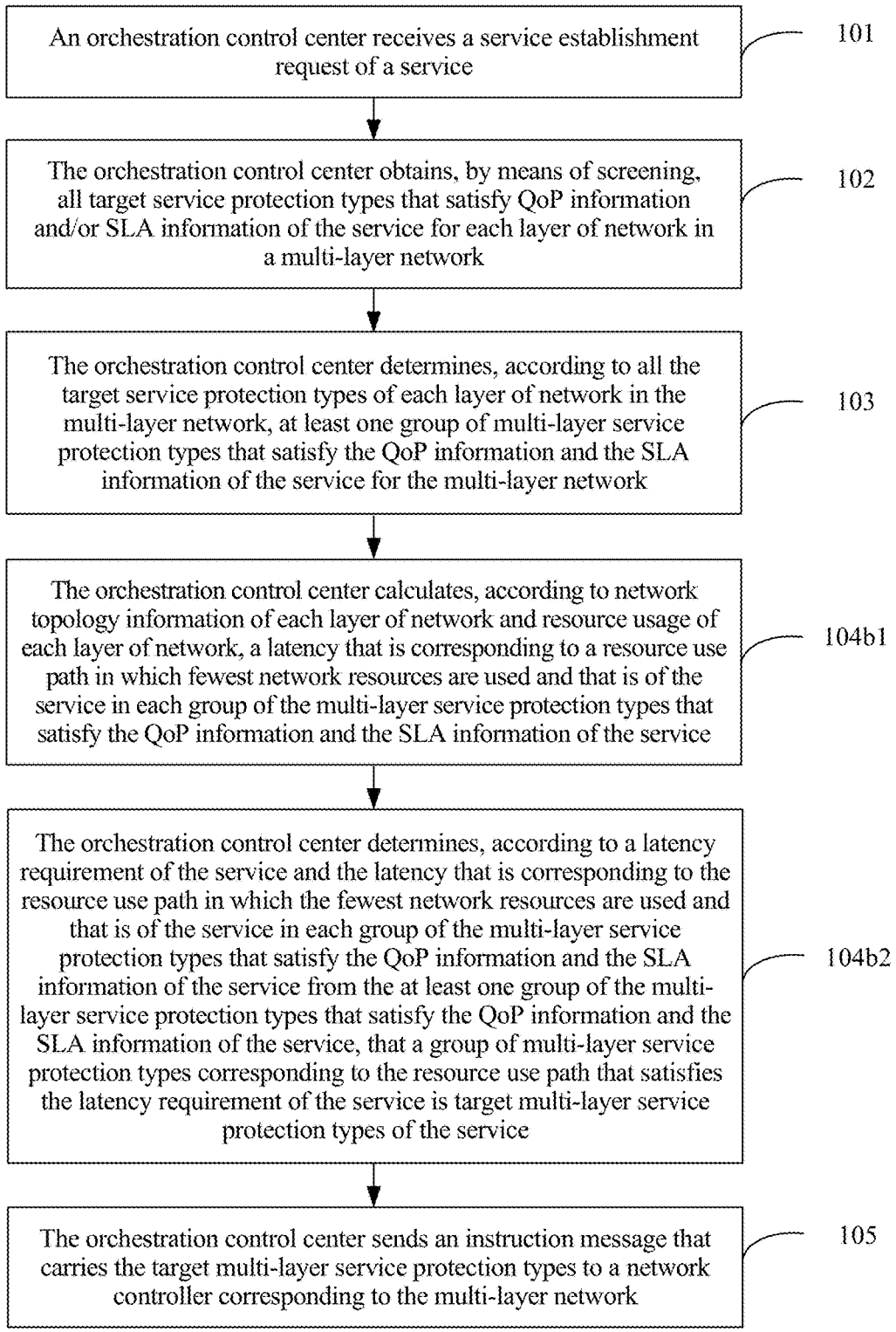
FIG. 5 is a schematic flowchart of yet another network service establishment method according to an embodiment of the present disclosure.

As shown in FIG. 5, when the service establishment request in step 101 further includes the latency requirement of the service, based on step 101 to step 105 that are provided in the foregoing embodiment, step 104 may be replaced with step 104b1 and step 104b2 in this embodiment. The method includes the following steps.

104b1. The orchestration control center calculates, according to the network topology information of each layer of network and the resource usage of each layer of network, a latency that is corresponding to a resource use path in which fewest network resources are used and that is of the service in each group of the multi-layer service protection types that satisfy the QoP information and the SLA information of the service.

104b2. The orchestration control center determines, according to the latency requirement of the service and the latency that is corresponding to the resource use path in which the fewest network resources are used and that is of the service in each group of the multi-layer service protection types that satisfy the QoP information and the SLA information of the service from the at least one group of the multi-layer service protection types that satisfy the QoP information and the SLA information of the service, that a group of multi-layer service protection types corresponding to the resource use path that satisfies the latency requirement of the service is the target multi-layer service protection types of the service.

For example, in solution 2, an embodiment corresponding to FIG. 5 is applied to a specific SDN network architecture for detailed description. A two-layer network constituted by an IP network and an optical transport network is used as an example for description.

Figure 4B:
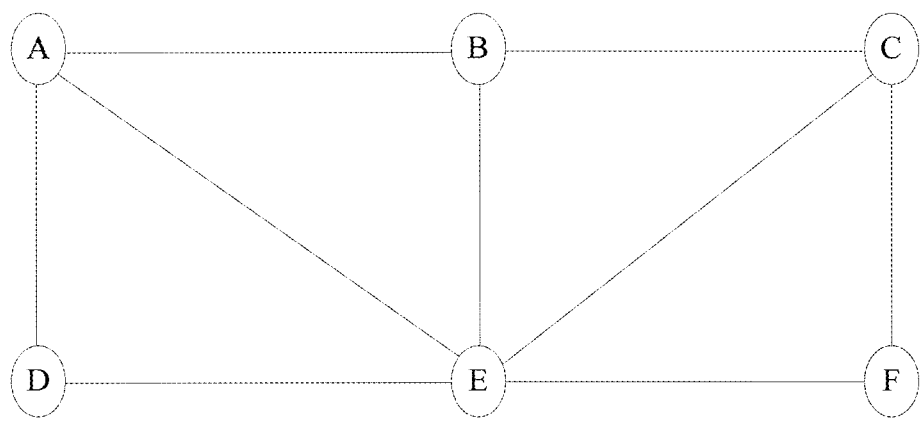
FIG. 4b is an optical network physical topology view according to an embodiment of the present disclosure.

Based on the SDN architecture shown in FIG. 3, it may be learned by referring to an optical network physical topology view shown in FIG. 4b that, if four IP links A-B, B-C, A-E, and E-C included in the IP network separately have ODU0 idle resources, a working path is A-B-C, an alternate path of a node B is A-E-C, a latency of IP links A-B and B-C at an optical layer is 1 ms, a latency of a one-fault-tolerant preset path A-E-B of A-B at the optical layer is 5 ms, a latency of a two-fault-tolerant preset path A-D-E-B is 8 ms, and physical paths, at a physical layer, of the two-fault-tolerant preset path A-D-E-B and physical links A-B and A-E-C do not pass through a same fiber.

(1) A user sends the service establishment request that includes the QoP information and the SLA information to the orchestration control center.

For example, the user dynamically requests to the orchestration control center for establishing a one-fault-tolerant MPLS-TE service bandwidth ODU0 with non-50 ms recovery, and a latency requirement is less than 7 ms.

(2) After receiving the service establishment request, the orchestration control center separately obtains, by means of screening, all target service protection types that satisfy the QoP information and/or the SLA information in the service establishment request for the IP layer and the optical layer, and determines, according to all the target service protection types, of the optical layer and the IP layer, obtained by means of screening, all multi-layer service protection types that satisfy the QoP information and the SLA information for the two-layer network constituted by the IP layer and the optical layer.

For example, the service protection types, of the IP layer and the optical layer, determined by the orchestration control center may include two multi-layer service protection types: VLAN 1:1 protection and hot-standby protection.

(3) The orchestration control center obtains IP topology information and optical layer topology information, resource usage of the IP layer, and resource usage of the optical layer.

Specifically, the orchestration control center obtains the idle resources of the IP links A-B, B-C, A-E, and E-C and the 5 ms latency of the one-fault-tolerant preset path A-E-B of the IP Link A-B at the optical layer, and the 8 ms latency of the two-fault-tolerant preset path A-D-E-B of the IP Link A-B at the optical layer.

(4) The orchestration control center pre-calculates, at two layers of abstract resource topologies, a path in which fewest resources are used and that is of the service in VLAN 1:1 protection and a corresponding latency a, and a path in which fewest resources are used and that is of the service in hot-standby protection and a corresponding latency b, and selects, according to a, b, and the latency requirement of the service, a group of resource use paths that satisfy the latency requirement of the service from a and b, where a multi-layer service protection type corresponding to the resource use path includes a target multi-layer service protection type that satisfies the QoP information and/or the SLA information of the service and that is of each layer of network in the multi-layer network.

Specifically, because the IP links A-B, and B-C in this embodiment have idle resources, and the link A-B is in a 1:1 sharing protection mode at the optical layer, the service may directly use an idle resource of the existing IP link A-B; in this way, fewest network resources are used, and the latency a satisfies the latency requirement 7 ms of the service. Therefore, it may be determined that the resource use path in which the fewest network resources are used satisfies the QoP information and the failover time of the service, that is, a service protection type of one-fault tolerance with non-50 ms recovery is the VLAN 1:1 protection. In addition, when the IP link A-B uses the two-fault-tolerant preset path A-D-E-B, because the corresponding 8 ms latency exceeds the latency requirement 7 ms of the service, a service requirement can be satisfied only by establishing the first SLA level.

(5) The orchestration control center sends service resource selection information that includes a service protection type and a solution in which fewest network resources are used to the router controller, where the service resource selection information includes the service protection type VLAN 1:1, and may further include information about the first SLA level, and a corresponding IP layer pipe type and a network technology level that are selected according to a principle that fewest network resources are newly added.

(6) The router controller calculates, according to the received service source selection information, the resource use path A-B-C in which the fewest resources are used when the service is in the VLAN 1:1 service protection type, establishes new IP links A-B_2 and B-C_2, and calculates and determines that a preset path of the IP link A-B_2 is A-E-B, and a latency is 5 ms, which satisfies a latency SLA requirement 7 ms.

(7) The router controller triggers a service node A in the IP network device to establish an A-B VLAN 1:1 IP link and a node B to establish a B-C 1:1 IP link. An IP link of the IP layer network at an upper layer is corresponding to an LSP in the OTN network device at a lower layer, and the router controller triggers the transport controller to successfully establish both an A-B ODU VLAN 1:1 LSP and a B-C ODU VLAN 1:1 LSP in the OTN network device, and return IP links resources to the router controller.

(8) The router controller updates the SLA level, requests and triggers the head node A to successfully establish an MPLS-TE service.

According to the network service establishment method provided in this embodiment of the present disclosure, an orchestration control center obtains, by means of screening according to QoP information and SLA information of a service, all target service protection types that satisfy the QoP information and the SLA information of the service for each layer of network in the multi-layer network, determines, according to all the target service protection types of each layer of network in the multi-layer network, at least one group of multi-layer service protection types that satisfy the QoP information and the SLA information of the service for the multi-layer network, determines target multi-layer service protection types of the service according to network topology information of each layer of network from all multi-layer service protection types that satisfy the QoP information and the SLA information of the service, and sends an instruction message that carries the target multi-layer service protection types to a network controller corresponding to the multi-layer network. The service needs fewest network resources in the target multi-layer service protection types, and because the target multi-layer service protection types consist of target service protection types of services in all layers of network, protection requirements of all the layers of network in the multi-layer network can be satisfied, service levels are elaborately differentiated, an SLA level is determined for the service, and a proper IP layer pipe type and a network technology level are selected for the service, thereby improving network resource utilization, and reducing network establishment costs.

Figure 6:
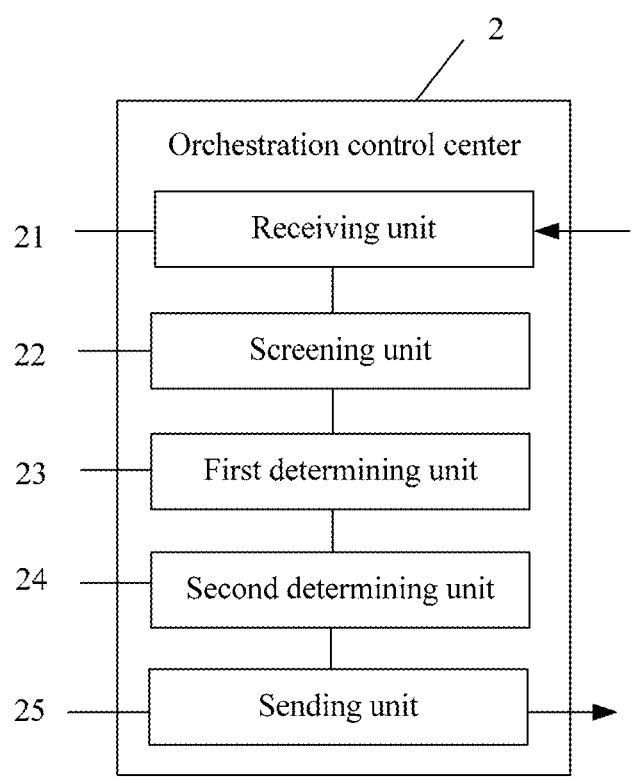
FIG. 6 is a schematic structural diagram of an orchestration control center according to an embodiment of the present disclosure.

An embodiment of the present disclosure provides an orchestration control center. The orchestration control center is used to implement the network service establishment method. A network in which the orchestration control center is located is a multi-layer network. As shown in FIG. 6, the orchestration control center 2 includes a receiving unit 21, a screening unit 22, a first determining unit 23, a second determining unit 24, and a sending unit 25.

The receiving unit 21 is configured to receive a service establishment request of a service; where the service establishment request includes quality of protection QoP information and service level agreement SLA information of the service; and the SLA information includes a failover time of the service.

The screening unit 22 is configured to obtain, by means of screening, all target service protection types that satisfy the QoP information and/or the SLA information of the service for each layer of network in the multi-layer network.

The first determining unit 23 is configured to determine, according to all the target service protection types that are obtained by the screening unit 22 by means of screening and that are of each layer of network in the multi-layer network, at least one group of multi-layer service protection types that satisfy the QoP information and the SLA information of the service for the multi-layer network; where each group of the at least one group of the multi-layer service protection types includes a target service protection type of each layer of network in the multi-layer network.

The second determining unit 24 is configured to determine a group of target multi-layer service protection types of the service according to network topology information of each layer of network and resource usage of each layer of network from the at least one group of the multi-layer service protection types that satisfy the QoP information and the SLA information of the service and that are determined by the first determining unit 23; where the service needs fewest network resources in the target multi-layer service protection types.

The sending unit 25 is configured to send an instruction message that carries the multi-layer service protection types determined by the second determining unit 24 to a network controller corresponding to the multi-layer network; where the instruction message is used to instruct the network controller of the multi-layer network to determine a service link according to the multi-layer service protection type.

Optionally, a target service protection type of at least one layer of network in the multi-layer network satisfies both the QoP information and the SLA information of the service, or a target service protection type of at least one layer of network satisfies the QoP information of the service and a target service protection type of at least one layer of network satisfies the SLA information of the service.

Optionally, the second determining unit 24 is specifically configured to:

calculate, according to the network topology information of each layer of network and the resource usage of each layer of network, a network resource required by the service in each group of the multi-layer service protection types that satisfy the QoP information and the SLA information of the service and that are determined by the first determining unit 23; and determine the group of the target multi-layer service protection types of the service according to the network resource required by the service in each group of the multi-layer service protection types that satisfy the QoP information and the SLA information of the service from the at least one group of the multi-layer service protection types that satisfy the QoP information and the SLA information of the service; where the service needs the fewest network resources in the target multi-layer service protection types.

Optionally, when the service establishment request further includes a latency requirement of the service, the second determining unit 24 is specifically configured to:

calculate, according to the network topology information of each layer of network and the resource usage of each layer of network, a latency that is corresponding to a resource use path in which fewest network resources are used and that is of the service in each group of the multi-layer service protection types that satisfy the QoP information and the SLA information of the service and that are determined by the first determining unit 23; and determine, according to the latency requirement of the service and the latency that is corresponding to the resource use path in which the fewest network resources are used and that is of the service in each group of the multi-layer service protection types that satisfy the QoP information and the SLA information of the service from the at least one group of the multi-layer service protection types that satisfy the QoP information and the SLA information of the service, that a group of multi-layer service protection types corresponding to the resource use path that satisfies the latency requirement of the service is the target multi-layer service protection types of the service.

Figure 7:
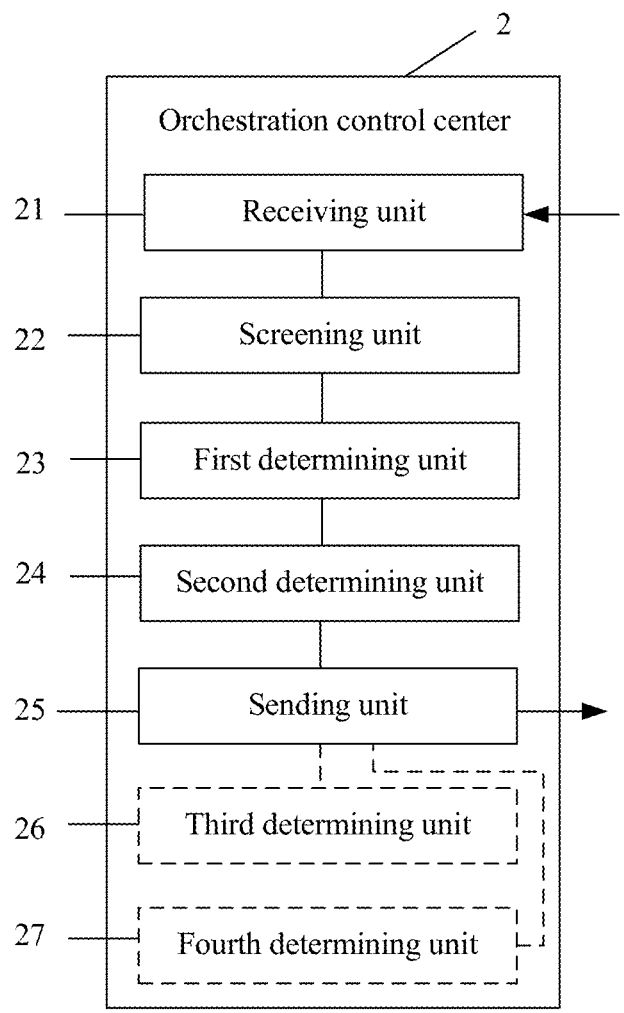
FIG. 7 is a schematic structural diagram of another orchestration control center according to an embodiment of the present disclosure.

Optionally, as shown in FIG. 7, the orchestration control center 2 further includes a third determining unit 26.

The third determining unit 26 is configured to determine a target multi-layer service protection type of the service and an SLA level of the service according to the network topology information of each layer of network and the resource usage of each layer of network.

Optionally, as shown in FIG. 7, the orchestration control center 2 further includes a fourth determining unit 27.

The fourth determining unit 27 is configured to determine an IP layer pipe type and/or a used network technology of the service according to the network topology information of each layer of network and the resource usage of each layer of network.

According to the orchestration control center provided in this embodiment of the present disclosure, the orchestration control center obtains, by means of screening according to QoP information and SLA information of a service, all target service protection types that satisfy the QoP information and the SLA information of the service for each layer of network in the multi-layer network, determines, according to all the target service protection types of each layer of network in the multi-layer network, at least one group of multi-layer service protection types that satisfy the QoP information and the SLA information of the service for the multi-layer network, determines target multi-layer service protection types of the service according to network topology information of each layer of network from all multi-layer service protection types that satisfy the QoP information and the SLA information of the service, and sends an instruction message that carries the target multi-layer service protection types to a network controller corresponding to the multi-layer network. The service needs fewest network resources in the target multi-layer service protection types, and because the target multi-layer service protection types consist of target service protection types of services in all layers of network, protection requirements of all the layers of network in the multi-layer network can be satisfied, thereby improving network resource utilization, and reducing network establishment costs.

Figure 8:
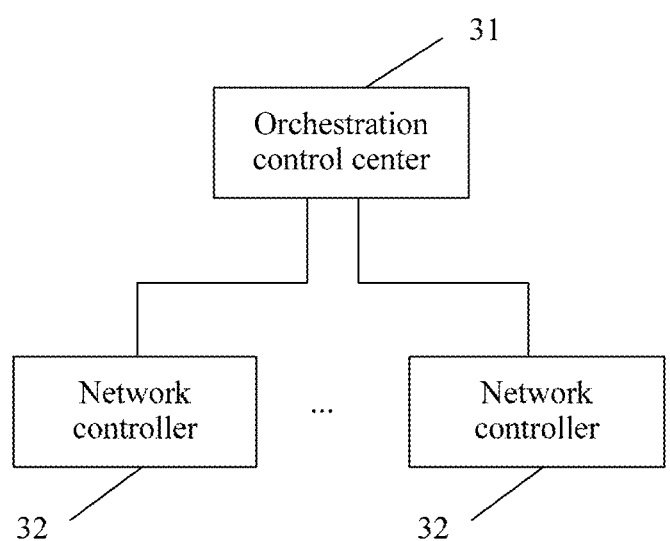
FIG. 8 is a schematic system diagram of a network system according to an embodiment of the present disclosure.

An embodiment of the present disclosure provides a network system. As shown in FIG. 8, the network system includes an orchestration control center 31 and network controllers 32 of all layers of network. The orchestration control center 31 is the orchestration control center 31 described in the embodiment.

The orchestration control center 31 is configured to receive a service establishment request of a service; where the service establishment request includes quality of protection QoP information and service level agreement SLA information of the service; and the SLA information includes a failover time of the service.

The orchestration control center 31 is further configured to obtain, by means of screening, all target service protection types that satisfy the QoP information and/or the SLA information of the service for each layer of network in a multi-layer network, and determine, according to all the target service protection types of each layer of network in the multi-layer network, at least one group of multi-layer service protection types that satisfy the QoP information and the SLA information of the service for the multi-layer network; where each group of the at least one group of the multi-layer service protection types includes a target service protection type of each layer of network in the multi-layer network.

The orchestration control center 31 is further configured to determine a group of target multi-layer service protection types of the service according to network topology information of each layer of network and resource usage of each layer of network from the at least one group of the multi-layer service protection types that satisfy the QoP information and the SLA information of the service; where the service needs fewest network resources in the target multi-layer service protection types.

The orchestration control center 31 is further configured to send an instruction message that carries the target multi-layer service protection types to a network controller corresponding to the multi-layer network.

The network controller 32 of the multi-layer network is configured to receive the instruction message, and determine a service link according to the multi-layer service protection types carried in the instruction message.

For example, the orchestration control center 31 may send the instruction message to a network controller of a network at a bottom layer, and the network controller 32 of the network at the bottom layer calculates, according to the network topology information of each layer of network and the resource usage of each layer of network, a resource use path in which fewest network resources are used and that is of the service in the multi-layer service protection type, determines IP link resources that need to be established and adjusted, and sends a resource establishment or removal request to a network controller 32 of a network at another layer, so that the network controller of the network at the another layer establishes, according to the resource establishment or removal request, a service link that needs to be established or removed by the network controller. Alternatively, the orchestration control center 31 may send the instruction message to a network controller 32 of each layer of network, and the network controller 32 of each layer of network calculates a resource use path in which fewest network resources are used and that is of the service in a service protection type corresponding to the network, and determines a service link that needs to be established or removed.

Optionally, a target service protection type of at least one layer of network in the multi-layer network satisfies both the QoP information and the SLA information of the service, or a target service protection type of at least one layer of network satisfies the QoP information of the service and a target service protection type of at least one layer of network satisfies the SLA information of the service.

Optionally, when determining the group of the target multi-layer service protection types of the service according to the network topology information of each layer of network and the resource usage of each layer of network from the at least one group of the multi-layer service protection types that satisfy the QoP information and the SLA information of the service, the orchestration control center 31 is specifically configured to:

calculate, according to the network topology information of each layer of network and the resource usage of each layer of network, a network resource required by the service in each group of the multi-layer service protection types that satisfy the QoP information and the SLA information of the service; and determine the group of the target multi-layer service protection types of the service according to the network resource required by the service in each group of the multi-layer service protection types that satisfy the QoP information and the SLA information of the service from the at least one group of the multi-layer service protection types that satisfy the QoP information and the SLA information of the service; where the service needs the fewest network resources in the target multi-layer service protection types.

Optionally, when the service establishment request further includes a latency requirement of the service, and when determining the group of the target multi-layer service protection types of the service according to the network topology information of each layer of network and the resource usage of each layer of network from the at least one group of the multi-layer service protection types that satisfy the QoP information and the SLA information of the service, the orchestration control center 31 is specifically configured to:

calculate, according to the network topology information of each layer of network and the resource usage of each layer of network, a latency that is corresponding to a resource use path in which fewest network resources are used and that is of the service in each group of the multi-layer service protection types that satisfy the QoP information and the SLA information of the service; and determine, according to the latency requirement of the service and the latency that is corresponding to the resource use path in which the fewest network resources are used and that is of the service in each group of the multi-layer service protection types that satisfy the QoP information and the SLA information of the service from the at least one group of the multi-layer service protection types that satisfy the QoP information and the SLA information of the service, that a group of multi-layer service protection types corresponding to the resource use path that satisfies the latency requirement of the service is the target multi-layer service protection types of the service.

Optionally, the orchestration control center 31 is further configured to determine a target multi-layer service protection type of the service and an SLA level of the service according to the network topology information of each layer of network and the resource usage of each layer of network.

Optionally, the orchestration control center 31 is further configured to determine an IP layer pipe type and/or a used network technology of the service according to the network topology information of each layer of network and the resource usage of each layer of network.

According to the network system provided in this embodiment of the present disclosure, an orchestration control center obtains, by means of screening according to QoP information and SLA information of a service, all target service protection types that satisfy the QoP information and the SLA information of the service for each layer of network in the multi-layer network, determines, according to all the target service protection types of each layer of network in the multi-layer network, at least one group of multi-layer service protection types that satisfy the QoP information and the SLA information of the service for the multi-layer network, determines target multi-layer service protection types of the service according to network topology information of each layer of network from all multi-layer service protection types that satisfy the QoP information and the SLA information of the service, where the service needs fewest network resources in the target multi-layer service protection types, and sends an instruction message that carries the target multi-layer service protection types to a network controller corresponding to the multi-layer network, where the network controller of the multi-layer network determines a service link according to the multi-layer service protection types carried in the instruction message. In addition, because the target multi-layer service protection types consist of target service protection types of services in all layers of network, protection requirements of all the layers of network in the multi-layer network can be satisfied, thereby improving network resource utilization, and reducing network establishment costs.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system and module, reference may be made to a corresponding process in the foregoing method embodiments, and details are not described herein again.

In the several embodiments provided in the present application, it should be understood that the disclosed system, apparatus, and method may be implemented in other manners. For example, the described system embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic, mechanical, or other forms.

In addition, functional modules in this application may be integrated into one processing module, or each of the modules may exist alone physically, or two or more modules are integrated into one module. The integrated module may be implemented in a form of hardware, or may be implemented in a form of a software functional module.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A network service establishment method for use in a multi-layer network, the method comprising:

receiving, by an orchestration control center, a service establishment request of a service, wherein the service establishment request comprises quality of protection (QoP) information and service level agreement (SLA) information of the service;

obtaining, for each network layer in the multi-layer network, all target service protection types that satisfy the QoP information and/or the SLA information of the service;

acquiring at least one group of multi-layer service protection types that satisfy the QoP information and the SLA information of the service, wherein the at least one group of multi-layer service protection types relates to all the target service protection types of each network layer in the multi-layer network, and each group in the at least one group of the multi-layer service protection types comprises a target service protection type of each network layer in the multi-layer network;

determining a group of target multi-layer service protection types of the service according to network topology information of each network layer and resource usage of each network layer from the at least one group of the multi-layer service protection types, wherein the service uses fewest network resources in the target multi-layer service protection types; and sending an instruction message that carries the target multi-layer service protection types to a network controller corresponding to the multi-layer network, wherein the instruction message instructs the network controller of the multi-layer network to determine a service link according to the target multi-layer service protection types.

2. The method according to claim 1, wherein:
a target service protection type of at least one network layer in the multi-layer network satisfies both the QoP information and the SLA information of the service; or
a target service protection type of at least one network layer satisfies the QoP information of the service and a target service protection type of at least one network layer satisfies the SLA information of the service.

3. The method according to claim 1, wherein determining a group of target multi-layer service protection types of the service according to network topology information of each network layer and resource usage of each network layer from the at least one group of the multi-layer service protection types comprises:
calculating, according to the network topology information of each network layer and the resource usage of each network layer, a network resource required by the service in each group of the multi-layer service protection types that satisfy the QoP information and the SLA information of the service; and
determining the group of the target multi-layer service protection types of the service according to the network resource required by the service in each group of the multi-layer service protection types that satisfy the QoP information and the SLA information of the service from the at least one group of the multi-layer service protection types that satisfy the QoP information and the SLA information of the service; wherein the service needs the fewest network resources in the target multi-layer service protection types.

4. The method according to claim 1, wherein the service establishment request further comprises a latency requirement of the service, determining a group of target multi-layer service protection types of the service according to network topology information of each network layer and resource usage of each network layer from the at least one group of the multi-layer service protection types comprises:
calculating, according to the network topology information of each network layer and the resource usage of each network layer, a latency that is corresponding to a resource use path in which fewest network resources are used and that is of the service in each group of the multi-layer service protection types that satisfy the QoP information and the SLA information of the service; and
determining, according to the latency requirement of the service and the latency that is corresponding to the resource use path in which the fewest network resources are used and that is of the service in each group of the multi-layer service protection types that satisfy the QoP information and the SLA information of the service and from the at least one group of the multi-layer service protection types that satisfy the QoP information and the SLA information of the service, that a group of multi-layer service protection types corresponding to the resource use path that satisfies the latency requirement of the service is the target multi-layer service protection types of the service.

5. The method according to claim 1, wherein after determining a group of target multi-layer service protection types of the service according to network topology information of each network layer and resource usage of each network layer from the at least one group of the multi-layer service protection types, the method further comprises:
acquiring a target multi-layer service protection type of the service and an SLA level of the service, wherein the target multi-layer service protection type and the SLA level of the service relate to the network topology information of each network layer and the resource usage of each network layer.

6. The method according to claim 5, wherein after determining a group of target multi-layer service protection types of the service according to network topology information of each network layer and resource usage of each network layer from the at least one group of the multi-layer service protection types, the method further comprises:
acquiring an IP layer pipe type and/or a used network technology of the service, wherein the IP layer pipe type and/or the used network technology of the service relate to the network topology information of each network layer and the resource usage of each network layer.

7. The method according to claim 1, wherein the SLA information comprises a failover time of the service.

8. An orchestration control center for use in a multi-layer network, the orchestration control center comprising:
a receiver, configured to receive a service establishment request of a service, wherein the service establishment request comprises quality of protection (QoP) information and service level agreement (SLA) information of the service;
a processor, configured to:
obtain, for each network layer in the multi-layer network, all target service protection types information and/or the SLA information of the service,
acquire at least one group of multi-layer service protection types that satisfy the QoP information and the SLA information of the service, wherein the at least one group of multi-layer service protection types relates to all the target service protection types of each network layer in the multi-layer network, and each group in the at least one group of the multi-layer service protection types comprises a target service protection type of each network layer in the multi-layer network, and
determine a group of target multi-layer service protection types of the service according to network topology information of each network layer and resource usage of each network layer from the at least one group of the multi-layer service protection types, wherein the service uses fewest network resources in the target multi-layer service protection types; and
a transmitter, configured to send an instruction message that carries the target multi-layer service protection types to a network controller corresponding to the multi-layer network, wherein the instruction message instructs the network controller of the multi-layer network to determine a service link according to the target multi-layer service protection types.

9. The orchestration control center according to claim 8, wherein:
a target service protection type of at least one network layer in the multi-layer network satisfies both the QoP information and the SLA information of the service; or
a target service protection type of at least one network layer satisfies the QoP information of the service and a target service protection type of at least one network layer satisfies the SLA information of the service.

10. The orchestration control center according to claim 8, wherein the processor is configured to:
  calculate, according to the network topology information of network layer and the resource usage of network layer, a network resource required by the service in each group of the multi-layer service protection types that satisfy the QoP information and the SLA information of the service; and
  determine the group of the target multi-layer service protection types of the service according to the network resource required by the service in each group of the multi-layer service protection types information and the SLA information of the service from the at least one group of the multi-layer service protection types information and the SLA information of the service; wherein the service needs the fewest network resources in the target multi-layer service protection types.

11. The orchestration control center according to claim 8, wherein when the service establishment request further comprises a latency requirement of the service, the processor is configured to:
  calculate, according to the network topology information of network layer and the resource usage of network layer, a latency that is corresponding to a resource use path in which fewest network resources are used and that is of the service in each group of the multi-layer service protection types that satisfy the QoP information and the SLA information of the service; and
  determine, according to the latency requirement of the service and the latency that is corresponding to the resource use path in which the fewest network resources are used and that is of the service in each group of the multi-layer service protection types that satisfy the QoP information and the SLA information of the service from the at least one group of the multi-layer service protection types that satisfy the QoP information and the SLA information of the service, that a group of multi-layer service protection types corresponding to the resource use path that satisfies the latency requirement of the service is the target multi-layer service protection types of the service.

12. The orchestration control center according to claim 8, wherein the processor is further configured to:
  acquire a target multi-layer service protection type of the service and an SLA level of the service, wherein the target multi-layer service protection type and the SLA level of the service relate to the network topology information of each network layer and the resource usage of network layer.

13. The orchestration control center according to claim 12, wherein the processor is further configured to:
  acquire an IP layer pipe type and/or a used network technology of the service, wherein the IP layer pipe type and/or the used network technology of the service relate to the network topology information of each network layer and the resource usage of network layer.

14. The orchestration control center according to claim 8, wherein the SLA information comprises a failover time of the service.

15. A network system for use in a multi-layer network, the network system comprising:
  an orchestration control center configured to:
  receive a service establishment request of a service, wherein the service establishment request comprises quality of protection (QoP) information and service level agreement (SLA) information of the service,
  obtain, for each network layer in the multi-layer network, all target service protection types that satisfy the QoP information and/or the SLA information of the service,
  acquire at least one group of multi-layer service protection types that satisfy the QoP information and the SLA information of the service, wherein the at least one group of multi-layer service protection types relates to all the target service protection types of each network layer in the multi-layer network, and each group in the at least one group of the multi-layer service protection types comprises a target service protection type of each network layer in the multi-layer network,
  determine a group of target multi-layer service protection types of the service according to network topology information of each network layer and resource usage of each network layer from the at least one group of the multi-layer service protection types, wherein the service uses fewest network resources in the target multi-layer service protection types, and
  send an instruction message that carries the target multi-layer service protection types to the network controller corresponding to the multi-layer network; and
  a network controller of the multi-layer network configured to receive the instruction message, and determine a service link according to the target multi-layer service protection types carried in the instruction message.

16. The network system according to claim 15, wherein:
  a target service protection type of at least one network layer in the multi-layer network satisfies both the QoP information and the SLA information of the service; or
  a target service protection type of at least one network layer satisfies the QoP information of the service and a target service protection type of at least one network layer satisfies the SLA information of the service.

17. The network system according to claim 15, wherein the orchestration control center is configured to:
  calculate, according to the network topology information of each network layer and the resource usage of each network layer, a network resource required by the service in each group of the multi-layer service protection types information and the SLA information of the service; and
  determine the group of the target multi-layer service protection types of the service according to the network resource required by the service in each group of the multi-layer service protection types that satisfy the QoP information and the SLA information of the service from the at least one group of the multi-layer service protection types that satisfy the QoP information and the SLA information of the service; and, wherein the service uses the fewest network resources in the target multi-layer service protection types.

18. The network system according to claim 15, wherein the service establishment request further comprises a latency requirement of the service, the orchestration control center is configured to:
  calculate, according to the network topology information of each network layer and the resource usage of each network layer, a latency that is corresponding to a resource use path in which fewest network resources are used and that is of the service in each group of the multi-layer service protection types information and the SLA information of the service; and determine, according to the latency requirement of the service and the latency that is corresponding to the resource use path in which the fewest network resources are used and that is of the service in each group of the multi-layer service protection types that satisfy the QoP information and the SLA information of the service from the at least one group of the multi-layer service protection types that satisfy the QoP information and the SLA information of the service, that a group of multi-layer service protection types corresponding to the resource use path that satisfies the latency requirement of the service is the target multi-layer service protection types of the service.

19. The network system according to claim 15, wherein the orchestration control center is further configured to:
acquire a target multi-layer service protection type of the service and an SLA level of the service, wherein the target multi-layer service protection type and the SLA level of the service relate to the network topology information of each network layer and the resource usage of each network layer.

20. The network system according to claim 19, wherein the orchestration control center is further configured to:
acquire an IP layer pipe type and/or a used network technology of the service, wherein the IP layer pipe type and/or the used network technology of the service relate to the network topology information of each network layer and the resource usage of each network layer.

* * * * *